US00RE38491E

(19) United States
(12) Reissued Patent
Mizutani et al.

(10) Patent Number: US RE38,491 E
(45) Date of Reissued Patent: Apr. 6, 2004

(54) COMPOSITION FOR PRODUCING LOW SINTERING TEMPERATURE CERAMIC DIELECTRICS AND METHOD OF MANUFACTURING SUCH DIELECTRICS

(75) Inventors: Hidetoshi Mizutani, Nagoya (JP); Masahiko Okuyama, Nagoya (JP); Noritaka Yoshida, Nagoya (JP); Hirofumi Ozeki, Nagoya (JP); Hiroshi Katagiri, Nagoya (JP)

(73) Assignee: NGK Spark Plug Co., Ltd., Nagoya (JP)

(21) Appl. No.: 09/526,502

(22) Filed: Mar. 15, 2000

Related U.S. Patent Documents

Reissue of:
(64) Patent No.: 5,759,935
Issued: Jun. 2, 1998
Appl. No.: 08/617,273
Filed: Mar. 14, 1996

(30) Foreign Application Priority Data

Mar. 20, 1995 (JP) ..... 7-087397

(51) Int. Cl.[7] ..... C04B 35/468
(52) U.S. Cl. ..... 501/139; 501/32; 501/138
(58) Field of Search ..... 501/32, 138, 139

(56) References Cited

U.S. PATENT DOCUMENTS 5,084,424 A 1/1992 Abe et al. ..... 501/138
5,128,289 A 7/1992 Wilson ..... 501/137
5,198,396 A 3/1993 Mizuno ..... 501/138
5,238,887 A 8/1993 Kato et al. ..... 501/138
5,296,424 A 3/1994 Wang et al. ..... 501/138

FOREIGN PATENT DOCUMENTS

JP 4-243966 9/1992
JP 4-243967 9/1992
JP 5-17213 1/1993

*Primary Examiner*—Elizabeth D. Wood
(74) *Attorney, Agent, or Firm*—Morgan, Lewis & Bockius LLP

(57) ABSTRACT

Powders of $BaCO_3$, $TiO_2$, ZnO, etc. are mixed to each other at a predetermined ratio of quantity, calcined in an atmospheric air at π°–120° C., and pulverized to obtain a calcined powder having an average grain size from 1 to 3 μm, 0.1 to 20 parts-by weight of a powder having an average grain size from 0.1 to 1.5 μm comprising a glass having a transition point of not higher than 450° C. obtained by mixing powders of $Pb_3O_4$, $SiO_2$, $Na_2O$, etc. to each other, melting and then pouring into water and pulverizing the thus obtained glass is admixed to the calcined powder. The mixture is dried, pelleted by adding a resin and the pellet powder is molded into a cylindrical shape, applied with CIP (Cold isotartic press), and the molding product after the treatment is sintered in an atmospheric air at 850° to 1000° C. to obtain a dielectric ceramic sintered at low temperature.

The resultant dielectric ceramic has high denseness and high unloaded Q value while maintaining τf within a practical range.

17 Claims, No Drawings

COMPOSITION FOR PRODUCING LOW SINTERING TEMPERATURE CERAMIC DIELECTRICS AND METHOD OF MANUFACTURING SUCH DIELECTRICS

Matter enclosed in heavy brackets [ ] appears in the original patent but forms no part of this reissue specification; matter printed in italics indicates the additions made by reissue.

BACKGROUND OF THE INVENTION

Field of the Invention

The present invention is directed to a composition for producing a ceramic dielectric and a method of making a ceramic dielectric from such a composition, wherein the composition can be sintered at a low temperature, has a high nonloaded Q value (hereinafter referred to as Q value) in a microwave bandwidth region, and is capable of being sintered simultaneously with a high conductivity conductor, such as silver or copper. The composition sintered at a lower temperature according to the present invention can be used, for example, in the production of ceramic dielectrics used in the construction of multilayer microwave resonators and filters.

Description of the Prior Art

The increase in the magnitude of communication information transmitted in recent years has promoted the rapid development of various communication system utilizing microwave bandwidth regions, such as cellular telephones, satellite communication and satellite broadcasting, as well as the development of various microwave dielectric materials to accommodate the industry's needs. The ceramic dielectrics used in the microwave bandwidth region exhibit characteristics that the Q value tends to reduce as the working frequency is increased. They are, furthermore, required to have the following characteristics:

(1) a high Q value in the microwave bandwidth region, (2) a high specific dielectric constant (er), and (3) a small absolute value for the temperature coefficient ($\tau f$) of the resonancy frequency.

Various kinds of compositions having the foregoing characteristics have been developed. Known compositions having a high Q value include, for example, $Ba(Mg_{1/3}Ta_{2/3})O_3$ and Ba $(Zn_{1/3}Ta_{2/3})O_3$. Known compositions having a high specific dielectric constant include, for example, a $BaO.TiO_2.RE_2O_3$ (in which RE represents a rare earth element), each of which is used as a resonator, a filter, or the like.

It has been recently proposed to employ a multilayer type dielectric resonator or filter using a conductor as an internal electrode to create multilayer ceramic materials utilized in a high frequency bandwidth region, such as a microwave, since it is necessary to form a high conductivity metallic conductor onto the surface of the composition. This is accomplished by sintering the conductor between ceramic layers. Noble metals, such as platinum or palladium, which are expensive but resistant to high temperature, are employed in the production of existing ceramic dielectrics in which the sintering temperature exceeds 1000° C., thus resulting in increased production costs. It is extremely advantageous if a composition is sinterable at a low temperature, for example, about, 900° C. This reduces the production costs since an inexpensive metal material, such as silver or copper, can be used as the conductor. Accordingly, the industry has demanded the development of a ceramic dielectric produced by a composition that can be sintered at a temperature of about 900° C.

Generally, sintering compositions at low temperatures involves such methods as: (a) adding glass frit as a sintering aid; (b) utilizing finely atomized submicron size starting materials; or (c) utilizing a chemical process, such as the sol-gel method. However, since the usual compositions have low reactivity with glass, they suffer from the added difficulty of forming compositions at high densities creating the additional problem of drastically reducing the Q value.

SUMMARY OF THE INVENTION

It is an object of the present invention to overcome the foregoing problems and provide a ceramic dielectric created by sintering a composition at a low temperature of about 900° C. Therefore, the compositions can be simultaneously sintered with a high conductivity conductor, such as silver or copper, to produce a ceramic dielectric having a high Q value in the microwave bandwidth and a small temperature coefficient of resonance frequency. A reduction in production costs is realized.

The foregoing object can be attained in accordance with the first aspect of the present invention by providing a ceramic dielectric by sintering a composition at a low temperature, when the composition comprises of a calcined powder, which contains from 0.1 to 20 parts by weight of ZaO, from 0.1 to 10 parts by weight of $Ta_2O_5$ and from 0.1 to 1 parts by weight of $MnO_2$, based on 100 parts by weight of a composition represented by: $BaO.xTiO_2$ (in which $3.0 \leqq x \leqq 5.7$). 0.1 to 20 parts by weight of a glass powder (based on 100 parts by weight of the calcined powder), having a transition point of lower than 450° C., are added to the calcined powder and then sintered.

In accordance with a second aspect of the present invention the calcined powder comprises of at least one of the following: less than 1 part by weight of $WO_3$, not more than 15 parts by weight of $SnO_2$, not more than 15 parts by weight of MgO, not more than 10 parts by weight of SrO, and not more than 5 parts by weight of $ZrO_2$ in combination with $BaO.xTiO_2$ based on 100 parts by weight of the composition represented by $BaO.xTiO_2$ (in which $3.0 \leqq x \leqq 5.7$).

Furthermore, according to the present invention, the product of the Q value and the resonance frequency of the composition may not be less than 2000 GHz.

Also, a ceramic dielectric can be obtained in accordance with a third aspect of the present invention by a process comprising the steps of combining starting materials to form a composition containing from 0.1 to 20 parts by weight of ZnO from 0.1 to 10 parts by weight of $Ta_2O_5$ and from 0.1 to 1 parts by weight of $MnO_2$, based on 100 parts by weight of a composition represented by: $BaO.xTiO_2$(in which $3.0 \leqq x \leqq 5.7$), calcining the composition of a temperature from 900° to 1200° C. to prepare the calcination product, then pulverizing the calcination product, admixing 0.1 to 20 parts by weight of a glass powder having a transition point of not higher then 450° C., to 100 parts by weight of the resultant calcinated powder, molding the mixture into a predetermined shape and then sintering the same at a temperature from 850° C. to 1000° C.

Moreover, a ceramic dielectric can be attained in accordance with a fourth aspect of the present invention by a process, wherein the composition is further blended with at least one of the following: less than 1 part by weight of $WO_3$, not more than 15 parts by weight of $SuO_2$, not more than 15 parts by weight of MgO, not more than 10 parts by weight of SrO and not more than 5 parts by weight of $ZrO_2$ as the starting material(s), based on 100 parts by weight of a composition represented by: $BaO.xTiO_2$ (in which $3.0 \leqq x \leqq 5.7$).

The composition according to the present invention has a high Q value in a microwave bandwidth region, a small temperature coefficient of resonance frequency, and as extremely high density (low water absorption). According to the process steps for producing the ceramic dielectric according to the present invention, a composition having both excellent density and dielectric characteristics can also be produced. This is accomplished by adding a specified amount of glass, having a predetermined transition point, to a specific ceramic raw material composition, formulated to effectuate sintering at a relatively low temperature. Therefore, a composition excellent both in density and dielectric characteristics can be obtained, thereby promoting sintering at a lower temperature without being problematic, even in the case where the total amount of the glass powder used is small, by using a glass powder containing a predetermined total amount of PbO or a predetermined amount of PbO and $R_2O$ (R represents an alkali metal element) and further using a calcined powder and a glass powder each of a predetermined average grain size.

DETAILED DESCRIPTION OF THE INVENTION

Applicants have made various studies of $BaO.xTIO_2$ compositions capable of being sintered at a low temperature to obtain a composition having a high Q value while maintaining τf within a practical characteristic range. The present invention, which is premised on this discovery, has overcome the reduction in the density of the sintering composition caused by the addition of the glass by adding a small amount of a specific glass powder having a predetermined transition point, which overcomes the reduction in the density of the composition, to the calcined powder composition, containing a specific amount of a predetermined metal oxide of the $Ba.TiO_2$ system, to the composition and then sintering them.

In the composition represented by $BaO.xTiO_2$, x is preferably within a range from 3.0 to 5.5, and ideally from 3.5 to 4.5. If x is less than 3.0 or more than 5.7, the Q value of the composition is lowered. Furthermore, ZnO and $Ta_2O_5$ are added to enable sintering at a low temperature even if the total amount of blending glass is small. If the total amount of ZnO or $Ta_2O_5$ is less than 0.1 parts by weight, low temperature sintering is difficult. If ZnO exceeds 20 parts by weight or $Ta_2O_5$ exceeds 10 parts by weight, the Q value is lowered. The total amount of ZnO is preferably within a range of 1 to 12 parts by weight, and ideally within a range of 1 to 10 parts by weight, while the total amount of $Ta_2O_5$ is preferably within a range of 0.3 to 8 parts by weight, and ideally with a range of 0.3 to 5 parts by weight. If the total amounts for both ZnO and $Ta_2O_5$ are within the abovementioned preferred ranges, sintering can be attained easily at a low temperature without lowering the Q value. Additionally, $MnO_2$ can be added to the composition to further improve sinterability. If $MaO_2$ is less than 0.1 parts by weight the density is insufficient, whereas the Q value and er are reduced if it exceeds 1 part by weight. If the total amount of $MnO_2$ is within a range of 0.1 to 0.8 parts by weight, and ideally within a range of 0.2 to 0.5 parts by weight, a composition of high density can be obtained without lowering the dielectric characteristic.

In a second aspect of the present invention, at least one of the oxides ($WO_3$, $SnO_2$, MgO, SrO and $ZrO_2$) other than (ZrO, $Ta_2O_5$; and $MnO_2$) may optionally be added. $WO_3$ is added for improving the Q value and, if the total amount exceeds 1 part by weight, the Q value is lowered somewhat.

$SnO_2$ is added for shifting the value of τf to the negative side and, if the total amount exceeds 15 parts by weight, the Q value and er are markedly lowered. The total amount of $WO_3$ is preferably within a range of 0.5 to 1 part by weight and the total amount of $SnO_2$ is preferably within a range of 1 to 12 parts by weight and, ideally within a range of 3 to 10 parts by weight. If the total amounts of the oxides are within the preferred ranges, a composition having excellent performance characteristics, e.g., a high Q and er value, can be obtained.

MgO is added for controlling the value of τf. Its addition decreases the absolute value of τf. If the total amount of MgO exceeds 15 parts by weight, the Q value and er are greatly lowered, SrO is added to increase Er and if the total amount exceeds 10 parts by weight, the Q value is lowered and τf is out of a practical range. Furthermore, $ZrO_2$ is added for shifting τf negatively and if the total amount exceeds 5 parts by weight the Q value is lowered. To attain a dielectric ceramic having a high Q value and er and a practical value for τf, the total amount of MgO should preferably be within a range of 1 to 10 parts by weight, and ideally within a range of 3 to 8 parts by weight. The total amount of SrO is preferably within a range of 0.5 to 10 parts by weight, and ideally within a range of a 1 to 5 parts by weight. The total amount of $ZrO_2$ is preferably within a range from 0.5 to 4 parts by weight, and ideally within a range of 1 to 3 parts by weight.

Glass is added for obtaining a dense sintering composition is low temperature sintering and if the transition point exceeds 450° C., a sufficiently dense sintering product cannot be obtained, particularly, if the added total amount is relatively small. If the total, amount added is less than 0.1 parts by weight, in spite of the fact that the transition point of the glass employed is not higher than 450° C., it is difficult to increase the density of the composition for low temperature sintering. On the other hand, if the total amount added exceeds 20 parts by eight, the Q-value is lowered remarkably, degrading the performance to such an extent that is virtually impossible to make measurements of the dielectric characteristics is a microwave bandwidth region. To obtain a composition with a sufficiently high density without reduction of the Q value and while maintaining excellent dielectric characteristics, the glass transition point is preferably within a range of 350° to 450° C., and ideally within a range of 370° to 430° C. The total amount of glass added is preferably within a range of 3 to 20 parts by weight, and ideally within a range of 5 to 15 parts by weight.

In a fifth aspect of the present invention, glass containing 5 to 60 mol % of PbO, based on the total amount of the glass, is added to further promote sintering of the composition at a low temperature. If the total amount of PbO is less than 5 mol %, the effect of promoting sintering is low, whereas the Q value of the resultant composition is lowered if it exceeds 60 mol %. The total amount of PbO is preferably within a range of 5 to 60 mol %, and ideally within a range of 10 to 50 mol %.

In a sixth aspect of the present invention, glass ideally containing 0.01 to 5 mol % of an alkali metal element oxide in addition to PbO is added to further improve sinterability and promote sintering at a low temperature even if the additional amount of glass is relatively small. If the amount of alkali metal oxide added is less than 0.01 mol %, the sintering promotion effect is small, whereas the Q value is lowered if the amount exceeds 5 mol %. The total amount of the oxide of the alkali metal element is preferably within a range of 0.01 to 5 mol %, and ideally within a range of 0.1 to 3 mol %.

In seventh to ninth aspects of the present invention, the average grain sizes of the calcined powder and the glass powder greatly influence the density of the sintering product. If the average grain size of the calcined powder is out of the range of 1 to 3 μm, the density of the resultant sintering product is undesirably lowered. It is not preferable for the average grain size of the glass powder to be outside of the range of 0.1 to 1.5 μm and particularly less than 0.1 μm, since uniform dispersion and mixing with the calcined powder is difficult. If the average grain size of the glass powder exceeds 1.5 μm, densification of the composition is undesirably insufficient. In a seventh aspect of the invention, the average grain size of the calcined powder should be within a range of 1 to 7 μm, preferably within a range of 1 to 4 μm, and ideally within a range of 1.5 to 2.5 μm. In an eighth aspect of the invention, the average grain size of the glass powder should be within a range of 0.2 to 7 μm, preferably within a range of 0.2 to 4 μm, and ideally within a range of 0.5 to 1.5 μm. Also, in a ninth aspect of the invention, the average grain size of the glass powder is preferably smaller than the average grain size of the calcined powder, and preferably within a range of 0.1 to 3 μm, and ideally within a range of 0.3 to 2 μm. By employing calcined and the glass powders having grain sizes within the foregoing ranges the powders can be easily dispersed and mixed homogenously and a composition of high density can be obtained.

In the tenth aspect of the present invention, if the calcination temperature is lower than 900° C., the Q value is reduced, whereas if it exceeds 1200° C., τF increases to a positive region and is outside a practical range. The calcination temperature is preferably within a range of about 900° to 1200° C. The calcination time is preferably within the range of about 2 to 10 hours, and ideally within a range of about 4 to 8 hours, although no particular restriction is implied. If the sintering temperature is lower than 850° C., densifying is difficult, whereas if the sintering temperature exceeds 1000° C., the Q value is reduced and τf is outside of a practical range. In addition, simultaneously sintering with a conductor material such as silver or copper becomes difficult. A preferable range for the sintering temperature is 850° to 950° C. A dielectric ceramic material sintered at a low temperature having a high Q value and a small τf and of high density can be obtained within this temperature range. Although there is no particular restrictions for the sintering time, it is preferably about 30 min to 5 hours, and ideally about 1 to 3 hours.

In the present invention, a composition sinterable at a low temperature with minimal degradation of the dielectric characteristic, having a high density and excellent dielectric characteristics can be obtained by adding a small amount of a specific glass ingredient having a low transition point to a calcined powder of the $BaO.TiO_2$ composition.

Also, if the reactivity with the ceramic raw material is not sufficient by the use of low transition point glass only, glass containing a predetermined amount of PbO may be used. Additionally, is the present invention, glass also containing an oxide of an alkali metal element together, which is usually considered undesirable because of reduction of the Q value, may be used, whereby the sinterability at a low temperature can be improved further by a smaller amount of such glass. The reduction in the dielectric characteristic is lessened since the amount of the particular glass used is small.

The reader's attention is specifically directed to the reaction between the ceramic raw material and glass in the present invention, when the calcined powder is sintered with the addition of the glass powder. The calcined powder and a liquefied glass react to form a liquid reaction product promoting sintering. Particularly, in the case of using glass containing PbO, consideration is given to the fact that the viscosity of the molten glass is reduced sufficiently at a sintering temperature of about 900° C., and sintering proceeds by chemical reaction with the calcined powder ingredient, thereby enabling densification at a low temperature of about 900° C.

The crystal phase of the composition obtained with the addition of glass is different from that obtained without the addition of glass. Furthermore, it is taken into consideration that the combination of the ceramic raw material of $BaO.TiO_2$ and the glass of PbO-alkali metal element oxide provides a remarkable sintering promotion effect because both materials have a high reactivity to each other and forms a specific eutectic liquid composition between them.

EXAMPLES

The present invention will now be described with reference to the following specific examples.

(1) Preparation of calcined powder

Each of the powders comprised of $BaCO_2$, $TiO_2$, ZnO, $Ta_2O_5$, $MnO_2$, $WO_3$, $SnO_2$, MgO, SrO and $ZrO_2$ is formulated such that the resultant calcined powder forms compositions, as shown in Table 1, is then pulverized and dry mixed. The resultant product mixture is calcined in an atmospheric air at a temperature of 1000° C. for 6 hours. After wet-pulverizing the calcined products, they are dried to obtain a calcined powder with an average grain size of about 2 μm. In Table 1, the symbol "*" indicates that the resultant values are outside the scope of the invention.

(2) Preparation of glass powder

Each of the powders comprised of $Pb_3O_4$ $SiO_2$, $H_3BO_3$, ZnO, CaO, $Bi_2O_3$, $Al_2O_3$ and $Na_2O$ is formulated such that the resultant glass powder forms compositions, as shown in Table 2, are mixed and then melted at a temperature of 1100° C., for 2 hours and then poured into water to form a glass. After wet-pulverizing the glass, they are dried to obtain a glass powder having an average grain size of about 1 μm.

(3) Preparation of composition sinterable at a lower temperature (a) Examples 1–30 and Comparative Examples 1–16

The thus obtained calcined powder (average grain size: 2 μm) and the glass powder (average grain size: 1 μm) are mixed in ethanol in combinations and ratios as shown in Tables 3–5, dried and then formed into a pellet with the addition of a resin (polyvinyl alcohol, 5 parts by weight to 100 parts by weight of the calcined powder and the glass powder). Each powder pellet is molded under a pressure of 800 kg/cm$^2$ into a cylindrical shape having a diameter at the bottom of 25 mm and a height of 15 mm. Subsequently, CIP (Cold Isotactic Press) is applied under a pressure of 1500 Kg/cm$^2$ to the molded product after the composition is sintered in atmospheric air at a temperature of 900° C. for 2 hours.

TABLE 1

| | Composition for calcined powder | | | | | | | | |
|---|---|---|---|---|---|---|---|---|---|
| | x value of | Additive (parts by weight based on 100 parts of $BaO\text{-}xTiO_2$) | | | | | | | |
| No. | $BaO\text{-}xTiO_2$ | ZnO | $Ta_2O_3$ | $MnO_2$ | $WO_3$ | $SnO_2$ | MgO | SrO | $ZrO_2$ |
| 1 | 3.0 | 12.0 | 5.0 | 0.2 | — | 5.0 | — | — | 1.0 |
| 2 | 3.5 | 15.0 | 6.0 | 0.2 | — | — | — | — | 3.0 |
| 3 | 4.0 | 5.0 | 5.0 | 0.3 | — | 10.0 | — | — | — |
| 4 | 4.0 | 10.0 | 8.0 | 0.2 | — | — | — | — | — |
| 5 | 4.0 | 12.0 | 4.0 | 0.2 | 0.8 | — | — | — | — |
| 6 | 4.3 | 5.0 | 2.0 | 0.2 | — | — | 5.0 | — | — |
| 7 | 4.3 | 7.0 | 8.0 | 0.2 | — | 3.0 | — | — | — |
| 8 | 4.5 | 4.0 | 2.0 | 0.2 | — | — | — | — | 3.0 |
| 9 | 4.5 | 5.0 | 4.0 | 0.2 | — | — | — | 2.0 | — |
| 10 | 5.5 | 1.5 | 0.5 | 0.2 | — | 3.0 | — | — | — |
| 11 | *2.7 | 15.0 | 6.0 | 0.2 | — | — | — | — | 3.0 |
| 12 | 4.0 | 10.0 | 8.0 | *1.3 | — | — | — | — | — |
| 13 | 4.0 | 12.0 | 4.0 | 0.2 | *1.5 | — | — | — | — |
| 14 | 4.0 | 12.0 | *12.0 | 0.2 | 0.8 | — | — | — | — |
| 15 | 4.0 | *25.0 | 4.0 | 0.2 | 0.8 | — | — | — | — |
| 16 | 4.3 | 5.0 | 2.0 | 0.2 | — | — | *18.0 | — | — |
| 17 | 4.3 | 7.0 | 8.0 | 0.2 | — | *17.0 | — | — | — |
| 18 | 4.5 | 4.0 | 2.0 | 0.2 | — | — | — | — | *6.0 |
| 19 | 4.5 | 5.0 | 4.0 | 0.2 | — | — | — | *12.0 | — |
| 20 | *5.8 | 1.5 | 0.5 | 0.2 | — | 3.0 | — | — | — |

TABLE 2

| | Glass powder composition | | | | | | | | |
|---|---|---|---|---|---|---|---|---|---|
| | Glass ingredient (mol %) | | | | | | | | Transition point |
| No. | PbO | $SiO_2$ | $B_2O_3$ | ZnO | CaO | $Bi_2O_3$ | $Al_2O_3$ | $Na_2O$ | (° C.) |
| 1 | 50 | 30 | 20 | — | — | — | — | — | 407 |
| 2 | 50 | 20 | 30 | — | — | — | — | — | 396 |
| 3 | 40 | 40 | 20 | — | — | — | — | — | 429 |
| 4 | 30 | 50 | 20 | — | — | — | — | — | 448 |
| 5 | 50 | 20 | 20 | 10 | — | — | — | — | 413 |
| 6 | 40 | 15 | 30 | 15 | — | — | — | — | 403 |
| 7 | 40 | 30 | 20 | 10 | — | — | — | — | 435 |
| 8 | 30 | 20 | 30 | 20 | — | — | — | — | 408 |
| 9 | 50 | 30 | 18 | — | — | — | — | 2 | 387 |
| 10 | 45 | 25 | 35 | 14 | — | — | — | 1 | 413 |
| 11 | 35 | 30 | 20 | 12 | — | — | — | 3 | 398 |
| 12 | — | 10 | 35 | 50 | 5 | — | — | — | *505 |
| 13 | — | — | 20 | — | 50 | 30 | — | — | *456 |
| 14 | — | — | 35 | — | 40 | — | 25 | — | *588 |

TABLE 3

| | Examples | | | | | | | |
|---|---|---|---|---|---|---|---|---|
| | | | Quantity ratio of powder | | | | | |
| Example No. | Calcined powder | Glass powder | Calcined product | glass | Water absorption (%) | $\tau_f$ | Q × f (GHz) | $\tau_p$ (ppm/° C.) |
| 1 | 1 | 1 | 90 | 10 | <0.1 | 34 | 2360 | +14 |
| 2 | 2 | 2 | 90 | 10 | <0.1 | 36 | 2730 | +18 |
| 3 | 3 | 3 | 90 | 10 | <0.1 | 32 | 2430 | +5 |
| 4 | 4 | 4 | 90 | 10 | <0.1 | 34 | 3250 | +11 |
| 5 | 5 | 1 | 90 | 10 | <0.1 | 31 | 3420 | +10 |
| 6 | 6 | 2 | 90 | 10 | <0.1 | 32 | 2530 | −15 |
| 7 | 7 | 3 | 90 | 10 | <0.1 | 34 | 3340 | −8 |
| 8 | 8 | 4 | 90 | 10 | <0.1 | 32 | 2950 | −8 |

TABLE 3-continued

| | Examples | | | | | | | |
|---|---|---|---|---|---|---|---|---|
| | | | Quantity ratio of powder | | | | | |
| Example No. | Calcined powder | Glass powder | Calcined product | glass | Water absorption (%) | $\tau_f$ | Q × f (GHz) | $\tau_p$ (ppm/° C.) |
| 9 | 9 | 1 | 90 | 10 | <0.1 | 45 | 2380 | +14 |
| 10 | 10 | 2 | 90 | 10 | <0.1 | 29 | 2690 | −12 |
| 11 | 1 | 5 | 90 | 10 | <0.1 | 33 | 2250 | +17 |
| 12 | 2 | 6 | 90 | 10 | <0.1 | 35 | 2530 | +12 |
| 13 | 3 | 7 | 90 | 10 | <0.1 | 32 | 2580 | +11 |
| 14 | 4 | 8 | 90 | 10 | <0.1 | 33 | 3060 | +13 |
| 15 | 5 | 5 | 90 | 100 | <0.1 | 30 | 3370 | +7 |

TABLE 4

| Examples | | | | | | | | |
|---|---|---|---|---|---|---|---|---|
| Example No. | Calcined powder | Glass powder | Quantity ratio of powder: Calcined product | Quantity ratio of powder: glass | Water absorption (%) | $\tau_f$ | Q × f (GHz) | $\tau_p$ (ppm/° C.) |
| 16 | 6 | 6 | 90 | 10 | <0.1 | 32 | 2620 | −11 |
| 17 | 7 | 7 | 90 | 10 | <0.1 | 33 | 3380 | −5 |
| 18 | 8 | 8 | 90 | 10 | <0.1 | 32 | 3130 | −6 |
| 19 | 9 | 6 | 90 | 10 | <0.1 | 43 | 2420 | +18 |
| 20 | 10 | 7 | 90 | 10 | <0.1 | 27 | 2580 | −9 |
| 21 | 1 | 9 | 95 | 5 | <0.1 | 30 | 2810 | +10 |
| 22 | 2 | 10 | 95 | 5 | <0.1 | 32 | 3010 | +9 |
| 23 | 3 | 11 | 95 | 5 | <0.1 | 31 | 2960 | +8 |
| 24 | 4 | 9 | 95 | 5 | <0.1 | 32 | 3620 | +8 |
| 25 | 5 | 10 | 95 | 5 | <0.1 | 28 | 3760 | +12 |
| 26 | 6 | 11 | 95 | 5 | <0.1 | 29 | 2890 | −14 |
| 27 | 7 | 9 | 95 | 5 | <0.1 | 30 | 3720 | −9 |
| 28 | 8 | 10 | 95 | 5 | <0.1 | 29 | 3520 | −9 |
| 29 | 9 | 9 | 95 | 5 | <0.1 | 40 | 2690 | +15 |
| 30 | 10 | 10 | 95 | 5 | <0.1 | 26 | 2950 | −10 |

TABLE 5

| Comparative Examples | | | | | | | | |
|---|---|---|---|---|---|---|---|---|
| Comparative No. | Calcined powder | Glass powder | Quantity ratio of powder: Calcined product | Quantity ratio of powder: glass | Water absorption (%) | $\tau_f$ | Q × f (GHz) | $\tau_p$ (ppm/° C.) |
| 1 | 11 | 3 | 90 | 10 | <0.1 | 44 | 600 | +12 |
| 2 | 12 | 8 | 90 | 10 | <0.1 | Measurement impossible | | |
| 3 | 13 | 1 | 90 | 10 | <0.1 | | | |
| 4 | 14 | 2 | 90 | 10 | <0.1 | 27 | 1430 | +12 |
| 5 | 15 | 11 | 90 | 10 | <0.1 | 35 | 1260 | +9 |
| 6 | 16 | 3 | 90 | 10 | <0.1 | 30 | 930 | −25 |
| 7 | 17 | 9 | 90 | 10 | <0.1 | Measurement impossible | | |
| 8 | 18 | 7 | 90 | 10 | <0.1 | | | |
| 9 | 19 | 4 | 90 | 10 | <0.1 | 32 | 1320 | −23 |
| 10 | 20 | 10 | 90 | 10 | <0.1 | 28 | 860 | −19 |
| 11 | 2 | 12 | 90 | 10 | 20 | Measurement impossible | | |
| 12 | 2 | 12 | 80 | 20 | 12 | | | |
| 13 | 2 | 13 | 90 | 10 | 17 | | | |
| 14 | 5 | 13 | 80 | 20 | 8 | | | |
| 15 | 5 | 14 | 90 | 10 | 34 | | | |
| 16 | 5 | 14 | 80 | 20 | 21 | | | |

After polishing the composition obtained as described above, the specific dielectric constant, the Q value and the temperature coefficient of resonance frequency ($\tau f$, temperature range: 25°–80° C.) are measured at a measuring frequency of 1 to 5 GHz. by a parallel conductor plate type dielectric resonator method. Products with large dielectric losses and not producing resonance waveforms are indicated with an "*" as detectable but measurement unable to be accurately recorded in each of the tables. Additionally, water absorption of the compositions was measured in accordance with JIS C2141.

Table 3 shows the results of Examples 1–15, Table 4 shows the results of Examples 16–30, and Table 5 shows the results of Comparative Examples 1–16. In Tables 3–5 and Tables 6–7 (described later) evaluation of the Q value is indicated by (Q×f). "f is the measuring frequency for the dielectric characteristic, which fluctuates somewhat on every measurement for the Q value. The dielectric loss is indicated more precisely by the form of the product.

According to the results shown in Tables 3–4, it can be seen that when the water absorption is less than 0.1%, the value (Q×f) is 2250 GHz at its least and the temperature coefficient of the resonance frequency is +18 ppm/° C. at its greatest. It can also be seen that compositions having extremely high densities and excellent dielectric characteristics can be obtained in each of Examples 1–30. In Examples 21–30, glass powder containing an oxide of an alkali metal element ($Na_2O$) is used, in which a composition of the same excellent performance can be obtained, although the quantity used is reduced to 5 parts by weight which is one-half of Examples 1–20, to demonstrate the effects of the oxide of the alkali metal element in the glass.

TABLE 6

| Examples 31–33 or Comparative Examples 17–20 | | | | | | | | |
|---|---|---|---|---|---|---|---|---|
| Exam. No. and Com. No. | Calcined powder | Glass powder | Quantity ratio of powder: Calcined product | Quantity ratio of powder: glass | Water absorption (%) | $\tau_f$ | Q × f (GHz) | $\tau_p$ (ppm/° C.) |
| 31 | 2 | 9 | 95 | 5 | <0.1 | 35 | 3860 | +8 |
| 32 | 4 | 5 | 80 | 20 | <0.1 | 29 | 2190 | +18 |
| 33 | 7 | 2 | 92 | 8 | <0.1 | 46 | 3430 | +9 |
| 17 | 2 | — | 100 | *0 | 25 | Measurement impossible | | |
| 18 | 2 | 9 | 75 | *25 | <0.1 | | | |
| 19 | 4 | 5 | 70 | *30 | <0.1 | | | |
| 20 | 7 | 2 | 80 | *40 | <0.1 | | | |

TABLE 7

| Examples | | | | | | | | | | |
|---|---|---|---|---|---|---|---|---|---|---|
| | | | Calcined powder | | Glass powder | | Water | | | |
| Example No. | Calcined powder | Glass powder | Quantity ratio | Grain size | Quantity ratio | Grain size | absorption (%) | $\tau_f$ | Q × f (GHz) | $\tau_p$ (ppm/° C.) |
| 34 | 2 | 1 | 90 | 1.2 | 10 | 0.7 | <0.1 | 35 | 2620 | +11 |
| 35 | 5 | 7 | 90 | 2.7 | 10 | 1.1 | <0.1 | 31 | 3410 | +9 |
| 36 | 9 | 10 | 90 | 2.3 | 10 | 1.4 | <0.1 | 43 | 2350 | +12 |

TABLE 7-continued

| | | | Examples | | | | | | | |
|---|---|---|---|---|---|---|---|---|---|---|
| | | | Calcined powder | | Glass powder | | Water | | | |
| Example No. | Calcined powder | Glass powder | Quantity ratio | Grain size | Quantity ratio | Grain size | absorption (%) | $\tau_i$ | Q × f (GHz) | $\tau_f$ (ppm/° C.) |
| 37 | 2 | 1 | 90 | 0.6 | 10 | 1.7 | 2 | 33 | 2460 | +15 |
| 38 | 5 | 7 | 90 | 2.3 | 10 | 5.2 | 3 | 29 | 3160 | +8 |
| 39 | 9 | 10 | 90 | 4.8 | 10 | 5.5 | 5 | 39 | 2280 | +16 |

On the other hand, it is apparent from the results in Table 5 that when the water absorption is less than 0.1% the density is sufficiently high, but the dielectric characteristic is so poor as to make the measurements impossible, in each of the comparative examples in which the total amounts of $MnO_2$, $WO_3$, $SnO_2$ or $ZrO_2$ exceeds its respective upper limit. The measurements are impossible to make in each of the examples in which the value x is outside of their respective upper and lower limits, in each of the comparative examples in which the total amounts of ZnO, $Ta_2O_3$, MgO or SrO exceed its respective upper limit. Although the density is high and the dielectric characteristic can be measured, the value (Q×f) is greatly degraded at 1430 GHz compared with each of the other to examples. Furthermore, in each of the examples in which a glass having a transition point higher than 450° C., is used, the dielectric characteristic is so poor as to make measurements impossible, even though the water absorption is as high as 8 to 34%, causing the density to be extremely low. The water absorption is increased as the glass transition point increases which tends to degrade the density further.

(b) Examples 31–33 and Comparative Examples 17–20

Compositions are prepared in the combinations selected from the calcined powder depicted in Table 1 and the glass powder depicted in Table 2 by the same method previously described with respect to Tables 1 and 2. The quantity ratios of the compositions are changed from those in each of the examples and comparative examples. The water absorption and the dielectric characteristics are measured by the previous described method. Table 6 displays numbers depicting the composition of the calcined powder and the composition of the glass powder, the ratios of the quantities in them and the result of measurements for the water absorption and the dielectric characteristics. In Table 6, a symbol "*" indicates that the value is outside of the scope of the invention.

The results of Table 6 disclose that compositions, excellent both in density and dielectric characteristic, can be obtained with a ratio of the glass powder of 5 to 20 parts by weight in relation to the 100 parts by weight of the calcined powder. The glass in Example 31 contains the oxide of the alkali metal element which is considered to contribute to the effect. As the ratio of the quantity of the glass powder is reduced, both (Q×f) and τf tend to improve. On the other hand, as is apparent from Comparative Example 17, that without the addition- of glass powder the resultant composition is extremely poor, both in its density and its dielectric characteristic, as well as are the combinations represented by Comparative Examples 18–20 employing glass powder of more than 25 parts by weight, whereby the dielectric characteristic is so poor as to be detectable but measurement is impossible, although the density is excellent.

(c) Examples 34–39

Compositions are prepared in combinations selected from the calcined powder in Table 1 and glass powder in Table 2 by the same method previously described in creating Tables 1 and 2, while varying the average grain size of each powder. The water absorption and the dielectric characteristic are measured utilizing the same methods as before. Table 7 displays composition amounts of the calcined powder and the compositions of the glass powder, the ratios between them, the particle size and the measurement results for the water absorption and the dielectric characteristics.

Table 7 reveals that compositions excellent both in density and dielectric characteristics can be obtained in Examples 34–36 in which each of the average grain sizes of the calcined powder and the glass powder is within the range defined by the seventh through ninth aspects of the present invention. However, in Examples 37–39, in which the grain size is outside the range of the invention, there is no particular problem with the dielectric characteristic, but the water absorption is between 2 to 5% and the density is somewhat poor. It can be seen particularly that as the particular size for both of the powders is increased the water absorption increases accordingly. The compositions are still within a range capable of practical use. This is demonstrated by the somewhat poor results achieved by the particular combination ratios employed by the seventh through ninth aspects of the inventions.

What is claimed is:

1. A ceramic dielectric prepared by low temperature sintering of a mixture comprising:

a calcined powder comprising a $BaO.xTiO_2$ compound, wherein $3.0 \leqq x \leqq 5.7$, from 0.1 to 20 parts by weight of ZnO per 100 parts by weight of the $BaO.xTiO_2$ compound, from 0.1 to 10 parts by weight of $Ta_2O_5$ per 100 parts by weight of the $BaO.xTiO_2$ compound, and from 0. 1 to 1 parts by weight of $MnO_2$ per 100 parts by weight of the $BaO.xTiO_2$ compound; and from 0.1 to 20 parts by weight of a glass powder per 100 parts by weight of the calcined powder, wherein the glass powder has a transition point less than or equal to 450° C.

2. The ceramic dielectric of claim 1, wherein the calcined powder further includes at least one of:

less than 1 part by weight of $WO_3$ per 100 parts by weight of the $BaO.xTiO_2$ compound;

not more than 15 parts by weight of $SaO_2$per 100 parts by weight of the $BaO.xTiO_2$ compound;

not more than 15 parts by weight of MgO per 100 parts by weight of the $BaO.xTiO_2$ compound;

not more than 10 parts by weight of SrO per 100 parts by weight of the $BaO.xTiO_2$ compound; and not more than 5 parts by weight of $ZrO_2$ per 100 parts by weight of the $BaO.xTiO_2$ compound.

3. The ceramic dielectric of claim 1 or 2, wherein the composition has a water absorption of not more than 0.5%, and wherein a product of an unloaded Q value and a resonance frequency of the composition is not less than 2000 GHz as measured using a parallel conductor plate type dielectric resonator method at a measuring frequency of 1–5 GHz.

4. A composition as defined in claim 3, wherein the water absorption of the composition is less than 0.1%.

5. A ceramic dielectric of claim 3, wherein the product of the unloaded Q value and the resonance frequency of the composition is not less than 3000 GHz.

6. The ceramic dielectric of claim 4, wherein the product of the unloaded Q value and the resonance frequency of the composition is not less than 3000 GHz.

7. A method of manufacturing a ceramic dielectric comprising the steps of:

calcining a composition at 900° to 1200° C. to provide a calcined product, the composition comprising a $BaO.xTiO_2$ ($3.0 \leqq x \leqq 5.7$) compound, from 0.1 to 20 parts by weight of ZnO per 100 parts by weight of the $BaO.xTiO_2$ compound, from 0.1 to 10 parts by weight of $Ta_2O_5$ per 100 parts by weight of the $BaO.xTiO_2$ compound, and from 0.1 to 1 parts by weight of $MaO_2$ per 100 parts by weight of the $BaO.xTiO_2$ compound;

pulverizing the calcined product;

mixing 1.0 to 20 parts by weight of a glass powder per 100 parts by weight of the pulverized calcined product with the pulverized calcined product, the glass powder having a transition point less than or equal to 450° C.;

molding the pulverized calcined product mixed with the glass powder; and sintering the molded pulverized calcined product mixed with the glass powder at 850° to 1000° C.

8. A method of 7, further comprising the step of blending with the composition at least one of:

not more than 1 part by weight of $WO_3$ per 100 parts by weight of the $BaO.xTiO_2$ compound;

not more than 15 parts by weight of $SnO_2$ per 100 parts by weight of the $BaO.xTiO_2$ compound;

not more than 15 parts by weight of MgO per 100 parts by weight of the $BaO.xTiO_2$ compound;

not more than 10 parts by weight of SrO per 100 parts by weight of the $BaO.xTiO_2$ compound; and not more than 5 parts by weight of $ZrO_2$ per 100 parts by weight of the $BaO.xTiO_2$ compound.

9. A method of claim 7 or 8 wherein the glass powder further includes 5 to 60 mol % of PbO per 100 mol % of the glass powder.

10. A method of claim 7 or 8, wherein the glass powder further includes 5 to 60 mol % of PbO and 0.01 to 5 mol % of $R_2O$ per 100 mol % of the glass powder, which R represents an alkali metal.

11. A method of claim 7 or 8, wherein an average grain size of the pulverized calcined product is from 1 to 3 μm, and wherein an average grain size of the glass powder is from 0.1 to 1.5 μm and is less than the average grain size of the pulverized calcined product.

12. A method of claim 9, wherein an average grain size of the pulverized calcined powder is from 1 to 3 μm, and wherein an average grain size of the glass powder is from 0.1 to 1.5 μm and is less than the average grain size of pulverized calcined product.

13. A method of claim 10, wherein an average grain size of the pulverized calcined product is from 1 to 3 μm, and wherein an average grain size of the glass powder is from 0.1 to 1.5 μm and is less than the average grain size of pulverized calcined product.

*14. A ceramic dielectric prepared by low temperature sintering of a mixture comprising:*

*a calcined powder including a $BaO.xTiO_2$ base compound ($3.0 \leqq x \leqq 5.7$), ZnO, $Ta_2O_5$ and $MnO_2$; and*

*a glass powder, wherein the glass powder has a transition point less than or equal to 450° C.; and*

*wherein the product of an unloaded Q value and a resonance frequency of the dielectric (Q×f) is not less than 2000 GHz as measured using a parallel conductor plate type dielectric resonator method at a measuring frequency of 1–5 GHz.*

*15. The ceramic dielectric of claim 14, wherein the product of an unloaded Q value and a resonance frequency of dielectric (Q×f) is not less than 3000 GHz.*

*16. A ceramic dielectric prepared by low temperature sintering of a mixture comprising:*

*a calcined powder comprising a $BaO.TiO_2$ compound, wherein $3.0 \leqq x \leqq 5.7$, from 0.1 to 20 parts by weight of ZnO per 100 parts by weight of the $BaO.xTiO_2$ compound, from 0.1 to 10 parts by weight of $Ta_2O_5$ per 100 parts by weight of the $BaO.xTiO_2$ compound, and from 0.1 to 1 parts by weight of $MnO_2$ per 100 parts by weight of the $BaO.xTiO_2$ compound; and*

*a glass powder, wherein the glass powder has a transition point less than or equal to 450° C.*

*17. A method of manufacturing a ceramic dielectric comprising of steps of:*

*calcining a composition at 900 to 1200° C. to provide a calcined product, the composition comprising a $BaO.TiO_2$ ($3.0 \leqq x \leqq 5.7$) compound, from 0.1 to 20 parts by weight of ZnO per 100 parts by weight of the $BaO.xTiO_2$ compound, from 0.1 to 10 parts by weight of $Ta_2O_5$ per 100 parts by weight of the $BaO.xTiO_2$ compound, and from 0.1 to 1 parts by weight of $MnO_2$ per 100 parts by weight of the $BaO.xTiO_2$ compound;*

*pulverizing the calcined product;*

*mixing a glass powder with the pulverized calcined product, the glass powder having a transition point less than or equal in 450° C.;*

*molding the pulverized calcined product mixed with the glass powder; and*

*sintering the molded pulverized calcined product mixed with the glass powder at 850 to 1000° C.*

* * * * *